United States Patent [19]

Termine et al.

[11] Patent Number: 5,380,802

[45] Date of Patent: * Jan. 10, 1995

[54] FIRE RETARDANT POLYOLEFIN FIBERS AND FABRICS

[75] Inventors: Enrico J. Termine, Lafayette; Ray W. Atwell, West Lafayette; Harry A. Hodgen, Battle Ground; Nicolai A. Favstritsky, Lafayette, all of Ind.

[73] Assignee: Great Lakes Chemical Corporation, West Lafayette, Ind.

[ * ] Notice: The portion of the term of this patent subsequent to Dec. 31, 2008 has been disclaimed.

[21] Appl. No.: 987,608

[22] Filed: Dec. 9, 1992

[51] Int. Cl.$^6$ .................. C08L 51/06; C08F 255/02
[52] U.S. Cl. ......................... 525/72; 525/288
[58] Field of Search ........................ 525/72, 70, 288

[56] References Cited

U.S. PATENT DOCUMENTS

| | | | |
|---|---|---|---|
| 3,050,476 | 8/1962 | Tress et al. | 521/60 |
| 3,177,270 | 4/1965 | Jones et al. | 525/263 |
| 3,218,117 | 11/1965 | Chen et al. | 66/186 |
| 3,331,797 | 7/1967 | Kopetz et al. | 524/412 |
| 3,458,597 | 7/1969 | Jabloner | 525/281 |
| 3,547,756 | 12/1970 | Oberst et al. | 428/213 |
| 3,598,708 | 8/1971 | Jackson, Jr. | 522/113 |
| 3,695,925 | 10/1972 | Weil | 428/254 |
| 3,716,391 | 2/1973 | Hosoda et al. | 427/302 |
| 3,883,481 | 5/1975 | Kopetz et al. | 524/288 |
| 3,957,835 | 5/1976 | Chien et al. | 552/5 |
| 3,959,398 | 5/1976 | Jalics | 570/200 |
| 4,179,401 | 12/1979 | Garnett et al. | 252/429 |
| 4,279,808 | 7/1981 | Hornbaker et al. | 525/72 |

(List continued on next page.)

FOREIGN PATENT DOCUMENTS

| | | |
|---|---|---|
| 3337223A | 5/1985 | Germany . |
| 55023151 | 8/1978 | Japan . |
| 6606050 | 10/1966 | Netherlands . |

OTHER PUBLICATIONS

Derwent Abstract WPI Database 80-52581C/30:JP 55078029 to Seikisui Plastics K.K., dated Jun. 12, 1980.
Derwent Abstract WPI Database 82-18631E/10: JP A57018236 to Seikisui Plastics K.K., dated Jan. 30, 1982.
Chemical Abstract CA77(14):89400r: German Offen.
(List continued on next page.)

Primary Examiner—James J. Seidleck
Assistant Examiner—M. L. Warzel
Attorney, Agent, or Firm—Woodard, Emhardt, Naughton Moriarty & McNett

[57] ABSTRACT

A flame-retarded polyolefin fiber made of a thermoplastic polyolefin and a graft copolymer composition represented by tile formula:

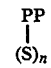

in which PP is polypropylene, and $S$ represents grafted side chains having halogenated monomeric units of the formula:

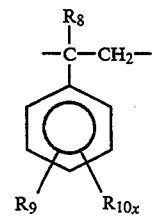

wherein $x = 1$ to 4, $R_8$ is H or $CH_3$, $R_9$ is H or a $C_{1-4}$ alkyl group, and $R_{10}$ is Br or Cl. In an alternate embodiment the flame-retarded polyolefin fiber further includes a halogenated bisphenol derivative represented by the formula:

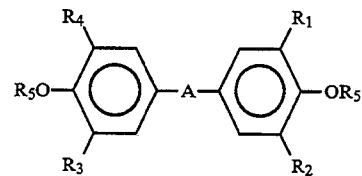

in which $R_1$ to $R_4$ are H, $CH_3$ or a halogen, $R_5$ is H, dihaloethyl, dihalopropyl or dihalobutyl, and A is a single bond, O, CO, S, $SO_2$ or $C(R_6)(R_7)$, where $R_6$ and $R_7$ are H or a $C_{1-4}$ alkyl.

13 Claims, No Drawings

U.S. PATENT DOCUMENTS

| | | | |
|---|---|---|---|
| 4,303,757 | 12/1981 | Kajimura et al. | 521/59 |
| 4,532,278 | 7/1985 | Hancock | 524/101 |
| 4,774,044 | 9/1988 | Cline et al. | 524/291 |
| 4,780,496 | 10/1988 | Termine et al. | 524/373 |
| 4,857,576 | 8/1989 | Kochi et al. | 524/409 |
| 4,863,764 | 9/1989 | Davis et al. | 427/393.3 |
| 4,966,946 | 10/1990 | Favstritsky et al. | 525/314 |
| 5,041,484 | 8/1991 | Atwell et al. | 524/278 |
| 5,077,337 | 12/1991 | Atwell et al. | 525/72 |
| 5,124,404 | 6/1992 | Atwell et al. | 525/72 |
| 5,216,059 | 6/1993 | Atwell et al. | 524/376 |

OTHER PUBLICATIONS

DE 2055427 to Praetzel, dated May 18, 1972.

Chemical Abstract CA98(18):144440q: JP 57/158247 A2 to Tokuyama Soda Co., Ltd., dated Sep. 30, 1982.

Chemical Abstract CA97(2):7731a: JP 57/39216 A2 to Chisso Corp., dated Mar. 4, 1982.

Chemical Abstract CA110(4):25053x: JP 63/99253 A2 to Saito et al., dated Apr. 30, 1988.

Chemical Abstract CA109(22):191487r: JP 63/33450 A2 to Umeda et al., dated Feb. 13, 1988.

Chemical Abstract CA107(2):8263m: JP 61/252256 A2 to Kobavashi et al., dated Nov. 10, 1986.

Chemical Abstract CA106(8):51161t: JP 61/168643 A2 to Inada et al., dated Jul. 30, 1988.

Chemical Abstract CA97(20):164039v: JP 57/73032 A2 to Teijin Chemicals, Ltd., dated May 7, 1982.

Chemical Abstract CA84(6):32042r: JP 50/23064 to Oraki, dated Aug. 5, 1975.

Chemical Abstract CA71(22):102579d: JP 44/3965 to Nakatsuka, et al., dated Feb. 19, 1969.

Derwent Abstract 85-111087/19: DE 3337-223-A to Chemische Fab Kalk GmbH, dated May 2, 1985.

Japanese Abstract 24231C/14: J5 5023-151 to Mitsui Toatsu Chem Inc., dated Feb. 19, 1980.

Derwent Abstract WPI Database 73-37311U/26: JP 48/20890 to S. Ejima et al., dated Jun. 25, 1973.

Derwent Abstract WPI Database 70-20648R/13: DE 1923505 to Toyo Rayon Company Limited.

Derwent Abstract Database WPI 68-71597P/00: Netherlands Appl. 6,606,050 to E. I. DuPont de Nemours & Co. issued Oct. 25, 1966.

P. Citovicky, M. Kosik, I. Spilda, K. Balog, and S. Kosik, "Thermoanalytical Investigation of Grafted Polypropylene With Fixed Flame Retardant Compounds," *Thermochim. Acta,* 93, 171–174 (1985).

CA95(2):8684h: B. J. Hill, U. Einsele, G. D. Modica, and D. Wattiez, "Fire Proofing by Radiation Grafting. Application on Polyester and Polypropylene," *Comm. Eur. Communities,* [Rep.] EUR, EUR 6718 (Eng) 1980.

CA93(8):72540u: M. Hartmann, B. Schulz and U. Ebenau, "Graft Copolymerizations of Vinylphosphonic Acid Derivatives on Atactic Polypropylene," *Z. Chem.,* 20(4), 146–147 (1980).

A. Mey-Marom and L. A. Rajbenbach, "Flame Retardance in Polyester Fabric Radiotically Grafted With Bromostyrene," *J. Appl. Poly. Sci.,* 28, 2411–2424 (1983).

Y. Avny, L. Rebenfeld and H.-D. Weighmann, "The In Situ Polymerization of Vinyl Monomers in Polyester Yarns," *J. Appl. Poly. Sci.,* 22, 125–147 (1978).

FIRE RETARDANT POLYOLEFIN FIBERS AND FABRICS

BACKGROUND OF THE INVENTION

1. Field of the Invention

The present invention relates generally to flame-retarded fibers, and more particularly to flame-retarded, polyolefin-based fibers. The inventive flame-retarded fibers are comprised of a thermoplastic polyolefin and a ring halogenated vinyl aromatic grafted onto a polyolefin, and may also include a halogenated bisphenol derivative.

2. Description of the Prior Art

Polyolefin fibers—predominantly polyethylene and polypropylene—are high volume/low cost synthetics that are remarkable for their stain and abrasion resistance. As with all plastics, certain uses have required that the flammability of the polymer be reduced. When decreased flammability has been required, it has generally not been provided by the fiber itself, but has instead been provided by one of the other components in the fabricated article. In carpeting, for example, enough fire retardant can be loaded into the latex binder to provide a measure of protection for the polyolefin face fiber.

One reason why the fiber itself has not been formulated to contain fire retarding agents is that no fire retarding agent has been found which leaves the fiber with an acceptable balance of normal polyolefin properties. In addition, the presence of an additive often adversely affects the melt spinning operation. For example, hexabromocyclododecane ("HBCD") can be compounded into polypropylene and the blend melt extruded into fibers. To be economical, however, the fiber must be produced at as high a rate as possible. This requires that melt viscosity be reduced by raising the die temperature. Unfortunately, normal processing temperatures for polypropylene cause degradation of HBCD and impart an unacceptable brown color to the fiber.

Many attempts have been made to produce acceptable ignition resistant polyolefin fibers and fabrics. Much of this work has focused on topical applications in which flame retarding agents were coated onto the surface of fibers after the fibers had been produced. Permanence was not always assured, as often the active ingredient was merely dispersed in a polymeric binder which was "painted" onto the polyolefin fiber. The quality of the binder determined the longevity of the treatment.

More sophisticated topical methods utilized phosphorus- or halogen-based monomers which were applied to the fiber and crosslinked in place. While providing ignition resistance, these approaches change the feel or "hand" of the fabric and reduce a key property of the polyolefins—soil resistance.

An important limitation of topical applications is that they are restricted to use with spun fiber, or more commonly, with constructed fabrics. They cannot be applied to the resin prior to—or what would be the most efficient, during—the fiber spinning operation. Topical applications therefore require an additional and costly step in the production process.

Other attempts to provide flame retardancy employ an "additive" approach. Almost any non-volatile compound containing bromine or chlorine may be mixed into polyolefins to provide some measure of ignition resistance. None has been successfully commercialized due to problems with the strength, color, odor or toxicity of the fiber.

One problem with known flame retardant additives is the difficulty of effectively dispersing them into the molten polyolefin. Additives are generally powders which do not dry blend evenly with plastic pellets. Because this mixture is fed directly from the melt extruder to the spinning die, localized concentrations of undispersed flame retardant will occur. This will cause plugging of the spinnerette and filament breakage, requiring a shutdown of tile process. One solution is to pre-disperse the additives in a suitable thermoplastic resin to form concentrated plastic pellets containing the modifiers. This solution, of course, requires additional and costly steps in the production process.

To avoid the problems associated with additives, attempts have been made to chemically bond modifiers to the polyolefin molecule to provide ignition resistant fibers. In one process, elemental chlorine and bromine are attached to the surface molecules of polyolefin fibers and films to provide self-extinguishing behavior. Similarly, the grafting of vinylchloride or vinylidene chloride to the surface of polyolefin fibers in order to obtain diminished flammability is known. As with the topical applications, these grafting approaches suffered from the limitation that they could only be applied as post-treatments, requiring additional steps in the production process.

Polyolefin fibers containing non-halogenated styrene grafted to polypropylene have also been manufactured. In one method, polypropylene-g-styrene is co-spun with polypropylene to produce a highly crimped fiber with good tensile strength. Similarly, the grafting of styrene onto pre-formed polypropylene fibers is known. In one method, a halo styrene in the form of chloromethylstyrene is grafted to polypropylene fiber to produce a material with improved sticking temperature, color fastness, water retention, antistatic behavior and wool-like hand with uniform dyeability. None of these methods provides adequate flame retardancy while retaining reasonable textile properties. Also, these approaches are generally limited to post-treatment of the fiber and therefore include the previously-discussed disadvantages incumbent therewith.

Concerning bromostyrene graft copolymers specifically, U.S. Pat. No. 5,077,337 to Atwell et al. discloses graft copolymers represented by the formula:

in which n is an integer >1; P is a polyolefin; and S is a side chain grafted to the polypropylene and having monomeric units of the formula:

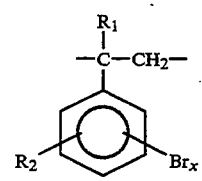

in which x=1 to 4; $R_1$ is H or $CH_3$; and $R_2$ is H or a $C_{1-4}$ alkyl, and notes that such graft copolymers would be an improvement over inert additives in the production of flame retardant spun fibers because clogging of spinnerettes and equipment wear would be avoided.

A need therefore exists for a polyolefin fiber which melts into the base polyolefin under normal spinning conditions leaving no solid particles to plug spinnerettes. A need also exists for a polyolefin fiber which is thermally stable, non-topical, non-blooming, non-volatile, UV stable, dry blendable and spinnable into 2 to 3 dpf microfibers without extra compounding steps. Also, a need exists for such a fiber which further does not impart objectionable odors to the spun fiber or constructed fabrics made thereof, and which has essentially the same texture or hand as nonflame-retarded fibers. Finally, a need exists for such a fiber which is further insoluble in water and is evenly distributed throughout the fiber to make it extremely resistant to removal by normal laundering conditions. The present invention addresses these needs.

SUMMARY OF THE INVENTION

Briefly describing the present invention, there is provided a flame-retarded polyolefin fiber made of a thermoplastic polyolefin and a graft copolymer composition represented by the formula:

wherein n is $>1$, PP is polypropylene, and S is a grafted side chain having halogenated monomeric units of the formula:

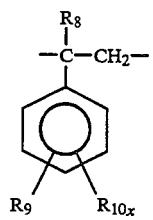

wherein $x = 1$ to 4; $R_8$ is H or $CH_3$; $R_9$ is H or a $C_{1-4}$ alkyl group; and $R_{10}$ is Br or Cl. In an alternate embodiment the flame-retarded polyolefin fiber further includes a halogenated bisphenol derivative represented by the formula:

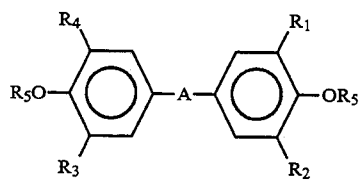

wherein $R_1$ to $R_4$ are H, $CH_3$ or halogen; $R_5$ is H, dihaloethyl, dihalopropyl or dihalobutyl; arid A is a single bond, O, CO, S, $SO_2$ or $C(R_6)(R_7)$, where $R_6$ and $R_7$ are H or a $C_{1-4}$ alkyl.

One object of the present invention is to provide a flame-retarded polyolefin fiber which displays minimal or no bloom of the incorporated flame retarding agents.

A further object of the present invention is to provide flame-retarded polyolefin fabrics which are useful in home, institutional and industrial settings, and which generally exhibit the desirable properties of unmodified fabrics.

A further object of the present invention is to provide flame-retarded polyolefin fibers having very fine denier without resorting to extraordinary mixing procedures.

Further objects and advantages of the present invention will be apparent from the following description.

DESCRIPTION OF THE PREFERRED EMBODIMENT

For the purposes of promoting an understanding of the principles of the invention, reference will now be made to the embodiment illustrated and specific language will be used to describe the same. It will nevertheless be understood that no limitation of the scope of the invention is thereby intended, such alterations, modifications and further applications of the principles of the invention being contemplated as would normally occur to one skilled in the art to which the invention relates.

The present invention provides a flame-retarded polyolefin fiber comprising: (1) a thermoplastic polyolefin, (2) a ring halogenated vinyl aromatic grafted onto a polyolefin, and optionally, (3) a halogenated bisphenol derivative.

The thermoplastic polyolefin may be chosen from any of the polymers made from olefins such as ethylene, propylene, butene, 2-methylpropene-1, octene and the like. Copolymers of these monomers may also be used. The more preferred polyolefins include copolymers containing at least 50% by weight of either copolymerized ethylene or propylene. The most preferred polyolefins are polyethylene and polypropylene. Mixtures of the above polymers may also be employed.

The graft copolymer is represented by the formula:

in which n is an integer $>1$; PP is polypropylene; and S is a side chain grafted to the polypropylene and having monomeric units of the formula:

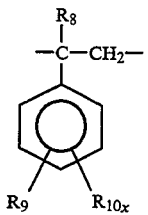

wherein $x = 1$ to 4; $R_8$ is H or $CH_3$; $R_9$ is H or a $C_{1-4}$ alkyl; and $R_{10}$ is Br or Cl.

A variety of thermoplastic polyolefins may be used as the graft base. These may, for example, include homopolymers and copolymers of ethylene, propylene, 1-butene, octene, vinylacetate and the like. Crystalline polypropylene homopolymer (isotactic or syndiotactic) is preferred as the base for the graft copolymer. Polymers with melt indices of 0.1 to 200 g/10 minutes (as measured by ASTM D-1238) may be employed. Preferred melt indices are from 1 to 50 g/10 minutes. A suitable graft base has been determined to be resin 10-5219 (Melt index=20) from Amoco Chemical Co.

The preferred ring halogenated vinyl aromatic may contain bromine or chlorine, or mixtures of bromine and chlorine, and may also be ring substituted with one or more aliphatic groups such as methyl, ethyl, propyl isomers, t-butyl and the like. More preferably, the ring halogenated vinyl aromatic is a brominated styrene which contains from 1 to 4 bromine atoms per ring. In particular, preferred compositions contain a high percentage of bromine while remaining in liquid form at room temperature. The most preferred monomer is dibromostyrene. As produced by Great Lakes Chemical Corporation, dibromostyrene normally contains about 15% monobromostyrene and 3% tribromostyrene by weight.

The halogenated monomer may also contain various storage stabilizers such as phenols or compounds of sulfur, nitrogen and phosphorus known to the industry to inhibit premature polymerization.

The halogenated monomer is grafted to the polypropylene using known methods including irradiation, peroxidation by exposure to oxygen at elevated temperatures, and abstraction of protons by free radical initiators. The graft polymerization may be performed using solution, suspension, emulsion or bulk procedures. The preferred method uses a free radical initiator such as dicumylperoxide, benzoylperoxide, t-butylperbenzoate, 2,2'-azobis(isobutyronitrile), cumenehydroperoxide or the like dissolved in the halogenated monomer at levels of from about 0.1% to about 5% on weight of the monomer, preferably from about 1% to about 3%, the solution being added to agitated molten polypropylene. The grafting is best carried out in a kneading type mixer such as Banbury, in an extruder, or on a two roll mill.

The quantity of monomer added is such that a flame retarding amount of bromine is present in the grafted composition, normally from about 1% to about 20% bromine, with about 3% to about 15% bromine being preferred. Alternatively, an excess of halogenated monomer may be added to produce a concentrate with levels of about 10% to about 60% bromine, preferably about 30% to about 50%, which may be let down with ungrafted polypropylene to obtain the final composition. The advantage in the latter approach is the maximization of physical strength properties by the introduction of polypropylene into the composition which has not been exposed to the harsh conditions of the grafting process.

Graft polymerization will typically result in production of both grafted polypropylene and ungrafted homopolymer of the halogenated monomer. It has been found that the grafted polypropylene and any homopolymer present will remain well intermixed, even during processing. The homopolymer could alternatively be removed, but this is not necessary. The preferred composition therefore includes both grafted polypropylene and halogenated homopolymer. In addition, the composition may also include ungrafted polypropylene.

Chain transfer agents may also be dissolved into the monomer prior to grafting in order to control the molecular weight of the halogenated polymer. Alkyl halides and mercaptans are particularly useful, with 1-dodecanethiol being preferred. Loadings of from 0.1% to 5% on the weight of the monomer may be used with 0.5% to 3% being typical.

During the grafting process a minor amount of other reactive unsaturated comonomers can be mixed into the halogenated styrene for the purpose of additional property modification. Examples of modifications that might be desirable include changes in color, clarity, lubricity, dyeability, melt viscosity, softening point thermal stability, ultraviolet stability, viscoelastic behavior, polarity, biodegradability, static charge dissipation, strength and stiffness. Examples of potential reactive comonomers are maleic anhydride, styrene, chloromethylstyrene, acrylonitrile, methylmethacrylate, acrylic acid, butene, butadiene and acrylamide.

Further property modification of the composition may be accomplished by including nonreactive additives, such as antioxidants, ultraviolet absorbers, antistatic agents, pigments, dyes, nucleating agents, fillers, slip agents, lubricants, antiblocking agents, plasticizers, and antimicrobials. The additives may be incorporated into the composition prior to grafting, during the grafting process, or as a separate compounding step following the graft polymerization. The latter approach provides the advantage of avoiding the possibility of harmful interaction between any of the property modifying additives and the chemistry of the grafting process.

The grafting is carried out at temperatures hot enough to reduce viscosity of the molten polypropylene, ensure thorough mixing during and after monomer addition, and promote decomposition of the initiator with the resulting rapid polymerization of the monomer. Temperatures of from 120° C. to 230° C. may be used depending on the molecular weight and crystallinity of the polypropylene, with ranges from 170° C. to 200° C. being preferred.

The grafting proceeds readily at atmospheric pressure; the elevated pressures encountered in plastics processing equipment may also be used. Following polymerization, a vacuum may be applied to reduce the amount of unreacted monomer.

The time necessary for the graft polymerization will depend on the temperature, choice of initiator and efficiency of mixing. Ranges from one second to several hours may be used, but in the interest of efficiency a typical polymerization time of 10 to 300 seconds is employed.

The third component of the mixture of the present invention is a halogenated bisphenol derivative having the general structure:

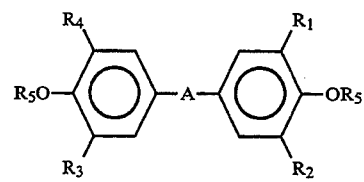

wherein $R_1$ to $R_4$ are H, $CH_3$ or halogen; $R_5$ is H, dihaloethyl, dihalopropyl or dihalobutyl; and A is a single bond, O, CO, S, $SO_2$ or $C(R_6)(R_7)$, where $R_6$ and $R_7$ are H or a $C_{1-4}$ alkyl.

A preferred class of compounds is represented by:

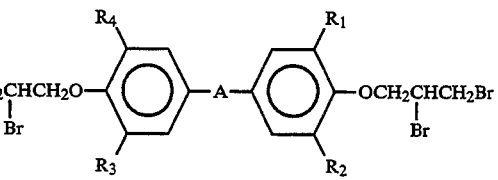

in which $R_1$ to $R_4$ and A are as previously defined. In a more preferred class, $R_1$ to $R_4$ are Br. The most preferred compound is the bisdibromopropyl ether of tetrabromobisphenol A, or TBBPA-bis(DBP).

Bisphenols that are especially useful in the preparation of compounds of the present invention are those which can be easily synthesized from phenol and ketones. Examples of these bisphenols are 2,2-bis(4-hydroxyphenyl)butane; 3,3-bis(4-hydroxyphenyl)hexane and the like. The most preferred is 2,2-bis(4-hydroxyphenyl)propane. The hydroxyphenyl portion of the molecule may be halogenated or contain methyl groups. The most preferred is 2,6-dibromophenol, which is best obtained by bromination after synthesis of the bisphenol.

Alternative bisphenols are those in which the hydroxyphenyl groups are directly connected (bisphenyls), connected by oxygen (diphenyl ethers), by carbonyl (ketones), by sulfur (thioethers), and by $SO_2$ (sulfones).

Ethers of the bisphenols are conveniently prepared using the Williamson synthesis. Typically the bisphenol is converted to the sodium phenoxide and is then contacted with an unsaturated alkyl halide at a temperature sufficient to complete ether formation. The unsaturated portion of the ether is then combined with elemental halogen using conditions well known in the art. Suitable unsaturated alkyl halides include 1-bromo-2-butene, 1-chloro-2-butene, 1-chloro-3-methylbutene, 3-chlorocyclopentene and the like. The preferred alkyl halide is allyl chloride or bromide.

The halostyrene graft component and the optional halogenated bisphenol component may be compounded into the polyolefin using methods well known in the industry. These may employ the use of Banbury type mixers, extruders, two roll mills, or other common plastics compounding equipment. The components may be added as individual ingredients, or alternatively the flame retardants may be precombined to provide a single convenient package. It is an advantage of the present invention that the precombined package can be produced in the form of easily conveyed, metered, and compounded non-dusting plastic pellets. This is a significant benefit since the most preferred bisphenol is a low-melting dusty powder. In addition, the bisphenol is difficult to mix into plastics because of its low melt viscosity. The precombined package avoids these problems.

Alternatively, the flame retardants may simply be dry blended with the polyolefin, utilizing the screw elements of the melt extruder to sufficiently mix the components.

The components are used at ratios needed to prevent or minimize bloom of the bisphenol and at a total loading to provide the desired level of flame retardancy. Weight ratios of graft copolymer to bisphenol may range from about 99:1 to about 1:99. A more preferred ratio range is from about 99:1 to about 50:50. The most preferred ratio is about 85:15. The components may be added to polyolefins at levels which provide an overall concentration of from about 0.1% to about 25% halogen, based on the weight of the entire composition. More preferred loadings are from about 0.5% to about 15% halogen. The most preferred loadings result in about 1% to about 10% halogen in the final composition.

In addition to the halogenated components of our invention, supplemental flame retardants may be utilized. Examples of these materials—sometimes referred to as synergists—include $Sb_2O_3$, $Sb_2O_5$, $Bi_2O_3$, $MoO_3$, $NH_4NO_3$, trityl compounds, 2,3-dimethyl-2,3-diphenylbutane, peroxides, and various phosphorus containing materials. These may be added during the final compounding step or may be included in the precombined package of the halogenated components.

The fibers of the present invention may be produced by methods known to the industry, such as solution spinning, melt spinning and "fibrillated" or slit films. The fibers may further be made into woven, non-woven or knitted fabrics as is known to the art.

The fibers of this invention may be physically mixed with fibers of other compositions. This may be desirable in order to modify properties such as hand, appearance, moisture retention, vapor permeability, dyeability, comfort and the like. Examples of fibers suitable for blending include those commonly identified as polyester, nylon, acrylic, cotton, rayon and acetate.

The invention will be further described with reference to the following specific Examples. It is to be understood that the Examples are provided to more completely describe preferred embodiments, and that no limitation to the scope of the invention is thereby intended. In the following Examples, percents indicated are percents by weight unless indicated otherwise.

EXAMPLE 1

A concentrate of dibromoshyrene grafted to polypropylene was prepared as follows:

2.1 g of dicumylperoxide were dissolved into 210 g of Great Lakes Dibromostyrene. In a batch process the monomer plus peroxide solution was added to 138 g of molten polypropylene homopolymer (Amoco 10-5219) in a Brabender Prep Center mixer. Bowl temperature was maintained at 180° C. while mixing at 50 rpm as the monomer was being added over a 10 minute period. Following the addition of the last of the monomer, the mixture was held an additional 5 minutes at 180° C. The product was emptied from the bowl, cooled to room temperature and granulated. The graft concentrate contained a calculated 36% bromine.

EXAMPLE 2

A 90/10 weight ratio blend of PP-g-DBS and TBBPA-bis(DBP) was prepared as follows:

4,500 g of PP-g-DBS was prepared as described in Example 1 and was dry blended with 500 g of TBBPA-bis(DBP). The mixture was fed into a Brabender Prep Center single screw extruder (L/d=25/1, all zones at 180° C., die=200° C., 60 rpm) fitted with a mixing head style screw. The molten blend was stranded, cooled in a water bath and pelletized to obtain off-white, non-dusting plastic pellets with a calculated bromine content of 39.2%.

EXAMPLES 3-5

A basic evaluation of the utility of PP-g-DBS compared with unmodified polypropylene was conducted as follows: Amoco 10-6352 polypropylene—with and without PP-g-DBS—was melt spun on a pilot scale fiber spinning line. A melt temperature of 270° C. and a draw ratio of 3:1 were used to produce a carpet-style yarn of 2,600 denier or about 18 dpf. The yarn was evaluated for breaking strength and flammability with the results shown in Table 1:

TABLE 1

| | Utility of PP-g-DBS in Spun Polypropylene Fiber | | |
|---|---|---|---|
| Example # | 3 (Comparative) | 4 | 5 |
| Flame Retardant | None | PP-g-DBS | PP-g-DBS |

TABLE 1-continued

| | Utility of PP-g-DBS in Spun Polypropylene Fiber | | |
|---|---|---|---|
| Example # | 3 (Comparative) | 4 | 5 |
| Bromine (Actual), % | 0 | 3.18 | 7.07 |
| Yarn Breaking Strength, lbs. | 17.17 | 17.26 | 15.30 |
| Knitted Fabric Flammability[1] | | | |
| Avg. Burn Time, sec.[2] | Consumes Entire Specimen | 101 | 5 |
| Avg. Burn Length, in.[3] | | 6.5 | 2.7 |

[1]Yarn of 2,600 denier was knitted into an 18 oz/sq.yd. fabric using a Brother Model KH-836E knitting machine. The fabric was tested using the NFPA 701 standard for flammability.
[2]Average time for the specimen to self-extinguish following the 12 second ignition.
[3]Burn length was measured from the bottom of the specimen holder to the highest point of fabric melt.

The results show that PP-g-DBS will reduce the flammability of polypropylene with little or no sacrifice in fiber strength. Antimony oxide or other synergists—while they may improve performance—are not required to impart a significant level of flame retardancy.

Also, it was noted that the hand of the knit fabric containing PP-g-DBS was essentially identical to that of the nonflame-retarded control.

EXAMPLE 6

Microfibers containing the graft copolymer are readily spun as follows.

4.17 lbs. of the graft copolymer concentrate prepared as in Example 1 were dry blended with 45.83 lbs. of Amoco 10-6352 polypropylene. The blend was fed to a pilot scale fiber spinning line. By adjusting the melt pump speed and the rate of fiber take-up, 2.3 denier filaments containing 3% bromine were easily produced. Melt temperature was maintained at about 270° C. No filament breakage or plugging of spinnerettes was observed.

EXAMPLE 7

A demonstration of the non-blooming behavior of the graft copolymer was conducted as follows:

44 lbs. of the graft copolymer concentrate prepared as in Example 1 were dry blended with 156 lbs. of Amoco 10-6352 polypropylene. The blend was melt spun under conditions similar to Examples 3–5 into a 350 denier yarn using a 3:1 draw ratio to produce 5 denier filaments containing a calculated 8% bromine. After aging the yarn for 8 months under ambient conditions to allow any bloom to occur, 10 yards were pulled through a piece of dark blue fabric firmly pinched against the yarn. There was no change in the appearance of the fabric, indicating that no visible amount of flame retardant had been transferred from the fiber surface.

EXAMPLE 8

(Comparative)

The undesirable blooming of a prior art compound was demonstrated as follows:

3.60 lbs. of decabromodiphenytoxide (DBDPO) were dry blended with 46.40 lbs. of Amoco 10-6352 polypropylene. The blend was fed to a 1.25 inch single screw extruder (L/d=25/1; Zones 1–5=285°, 285°, 290°, 295° and 295° C.; 55 rpm) fitted with a mixing head screw. The compounded material was stranded, cooled and granulated to give white pellets containing a calculated 6% bromine.

The pellets were spun into fibers using the same procedures as in Example 7. The yarn was aged and given the "blue fabric test" as previously described, but this time a white smudge was left on the fabric, indicating a transfer of the DBDPO from the yarn.

Even though a lower loading of DBDPO was used (6% vs. 8% bromine for the PP-g-DBS) and an extra compounding step was included to thoroughly mix in the DBDPO, it still bloomed to the surface of the fiber while the graft copolymer did not.

EXAMPLES 9 AND 10

The efficiency of a PP-g-DBS/TBBPA-bis(DBP) blend was compared with PP-g-DBS by itself as a flame retardant for melt spun polypropylene:

The additives were dry blended into Amoco 10-6352 polypropylene homopolymer, then melt spun on a pilot scale fiber spinning line. A melt temperature of 270° C. was maintained with a draw ratio of 3:1. Filaments of 15 dpf were produced with a yarn denier of 1,080. In order to test flame retardancy, the yarns were knitted into 9.1 oz/sq yd. fabrics using a Brother Model KH-836E knitting machine. Efficiency of the flame retardants was compared using the NFPA 701 vertical burn test. Results are shown in Table 2.

TABLE 2

| Comparison of Blend Efficiency in Knitted Fabrics | | |
|---|---|---|
| Example Number | 9 | 10 |
| Flame Retardant used | PP-g-DBS (Example 1) | 90/10 Blend (Example 2) |
| Amount of Flame Retardant, g | 757 | 697 |
| Amount of Polypropylene, g | 8323 | 8383 |
| Calculated Br in Fiber, % | 3.0 | 3.0 |
| Average Burn Time, sec.[1] | 45 | 0 |
| Average Burn Length, in.[2] | 6.4 | 3.4 |
| Flaming Drips?[3] | Yes | No |

These results demonstrate that the flame retarding efficiency of a 90/10 blend of PP-g-DBS/TBBPA-bis(DBP) is dramatically greater than that of PP-g-DBS on an equal bromine basis.

EXAMPLE 11

Mixtures of graft copolymer compositions, as previously described, are made with halogenated bisphenol derivatives. The bisphenol derivatives have the formula:

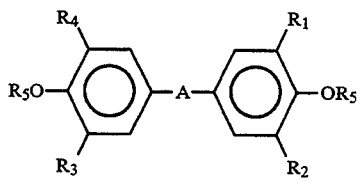

in which $R_1$ to $R_4$=H, $CH_3$ or halogen; $R_5$=H, dihaloethyl, dihalopropyl or dihalobutyl; and A=a single bond, O, CO, S, $SO_2$ or $C(R_6)(R_7)$, wherein $R_6$ and $R_7$ =H or $C_{1-4}$ alkyl. The bisphenol derivatives further specifically include those having the formula:

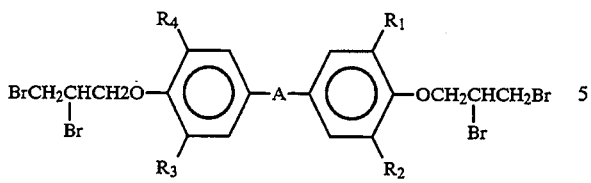

in which $R_1$ to $R_4$ and A are as previous defined. Mixtures of the foregoing bisphenol derivatives and graft copolymer compositions yield flame retardant additive compositions useful with a variety of thermoplastic polyolefins. The ratios of the bisphenol derivative to the graft copolymer include 99:1, 15:85, 50:50 and 1:99, and yield desirable flame retardant additives.

EXAMPLE 12

Upon addition of the foregoing flame retardant additives of Example 11 to thermoplastic polyolefins, namely polypropylene, polyethylene, polybutylene and polystyrene, flame retardant polyolefins are obtained. The mixtures of the flame retardant additives and thermoplastic polyolefins are made at bromine levels (based on weight percent of the overall composition) of 0.1, 0.5, 1, 10, 15 and 25%, and improved flame retardancy for the thermoplastic polyolefins, over the non-additive containing thermoplastic polyolefins, is achieved.

EXAMPLE 13

Graft copolymers from Example 11 are blended with the polypropylene as in Example 12 and fibers are produced from the blend. Favorable fire-retardant properties are obtained.

While the invention has been illustrated and described in detail in the foregoing description and Examples, the same are to be considered as illustrative and not restrictive in character, it being understood that only the preferred embodiment has been shown and described and that all changes and modifications that come within the spirit of the invention are desired to be protected.

What is claimed is:

1. A flame-retarded polyolefin fiber, comprising:
   (a) a thermoplastic polyolefin; and
   (b) a graft copolymer composition represented by the formula:

$$\begin{array}{c} PP \\ | \\ (S)_n \end{array}$$

wherein n is an integer $>1$, PP is polypropylene, and S represents grafted side chains having halogenated monomeric units of the formula:

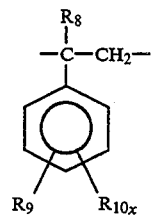

wherein $x = 1$ to 4; $R_8$ is H or $CH_3$; $R_9$ is H or a $C_{1-4}$ alkyl group; and $R_{10}$ is Br or Cl; and wherein said thermoplastic polyolefin and said graft copolymer are spun into a fiber.

2. The flame-retarded polyolefin fiber of claim 1 wherein said graft copolymer includes at least about 1% bromine by weight of the graft copolymer.

3. The flame-retarded polyolefin fiber of claim 1 in which $R_{10}$ is Br.

4. The flame-retarded polyolefin fiber of claim 3 in which said graft copolymer comprises about 1% to about 60% by weight bromine.

5. The flame-retarded polyolefin fiber of claim 4 in which said graft copolymer comprises about 1% to about 20% by weight bromine.

6. The flame-retarded polyolefin fiber of claim 5 in which said graft copolymer comprises about 3% to about 15% by weight bromine.

7. The flame-retarded polyolefin fiber of claim 4 in which said graft copolymer comprises about 30% to about 50% by weight bromine.

8. The flame-retarded polyolefin fiber of claim 1 in which the polyolefin is selected from the group consisting of polymers and copolymers of propylene, ethylene, butene, hexene, 2-methyl-1-propene, octene and mixtures thereof.

9. The flame-retarded polyolefin fiber of claim 8 in which the thermoplastic polyolefin is selected from the group consisting of polypropylene and polyethylene.

10. The flame-retarded polyolefin fiber of claim 9 and which comprises 0.5% to 15% by weight halogen.

11. The flame-retarded polyolefin fiber of claim 1 in which the polyolefin is at least about 50% polyethylene or at least about 50% polypropylene.

12. The flame-retarded polyolefin fiber of claim 11 and which comprises 0.1% to 25% by weight halogen.

13. The flame-retarded polyolefin fiber of claim 12 and which comprises 1% to 10% by weight halogen.

* * * * *